Feb. 2, 1943.  J. A. CONTI  2,310,064
TRICYCLE
Filed July 18, 1941
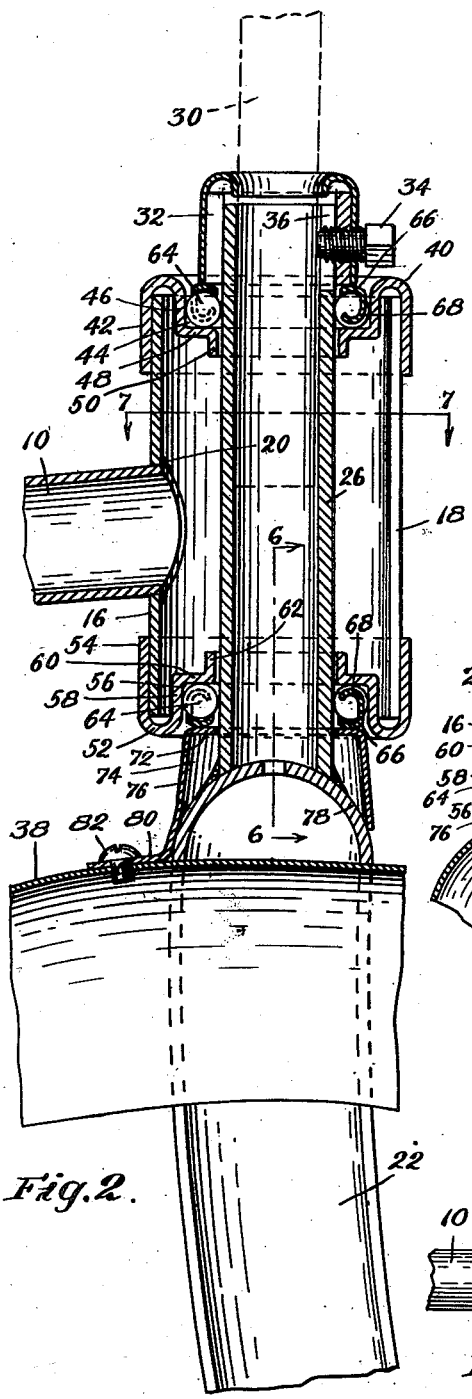
Fig. 2.
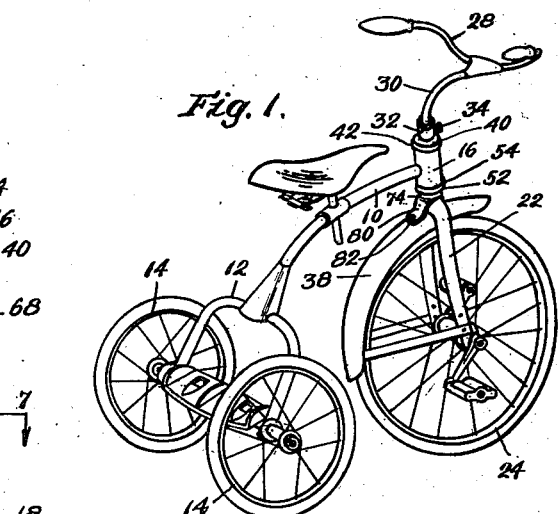
Fig. 1.
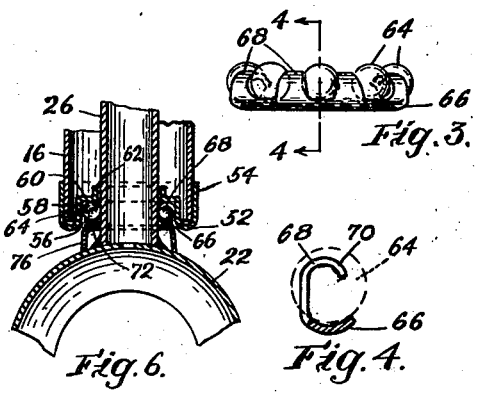
Fig. 3.
Fig. 6.
Fig. 4.
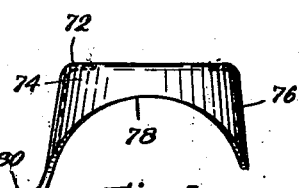
Fig. 5.
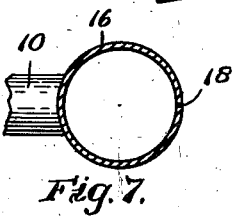
Fig. 7.
Inventor.
John A. Conti
atty Patented Feb. 2, 1943

2,310,064

UNITED STATES PATENT OFFICE 2,310,064

TRICYCLE

John A. Conti, East Templeton, Mass., assignor to Hedstrom-Union Company, Gardner, Mass., a corporation of Massachusetts Application July 18, 1941, Serial No. 402,949

12 Claims. (Cl. 280—279)

This invention relates to tricycles and the like and particularly to an anti-friction bearing construction for supporting the front wheel or steering fork of the tricycle.

The front wheel, or steering fork of a velocipede or tricycle is rotatable in the front part of the frame or backbone and also has to support the weight of the frame and the rider. An anti-friction bearing construction for the front fork thus should preferably support a combined radial and axial load. Heretofore, an anti-friction bearing construction for a front fork has necessitated cones and nuts which are screw-threaded on the tubular part of the fork to hold the ball or other anti-friction bearings in place. The construction thus is relatively expensive and also can readily be tampered with and thrown out of adjustment.

An object of the present invention is an anti-friction construction that eliminates all threaded connections between the parts and is relatively cheap and inexpensive and easily assembled.

A further object of the invention is a ball bearing construction for the front fork of a tricycle or velocipede wherein the bearing balls are retained in a retainer ring of such construction that the bearing is well adapted to support both radial and axial thrust.

A yet further object of the invention is the provision of a bearing construction comprising a tubular housing for the front fork, the housing having end caps that are provided with recesses in which bearing balls are located, the fork being extended through the end caps and engaged radially with the bearing balls and also axially by members at least one of which is removable to permit the insertion and withdrawal of the fork with respect to the housing.

An additional object of the invention is the provision of a bearing construction as above described wherein the end caps are so arranged as to provide rotatable support for the front fork in the event of loss of an anti-friction bearing.

A further object is generally to improve the construction of tricycles and bearings for the front fork thereof.

Fig. 1 is a perspective view of a tricycle embodying the present invention.

Fig. 2 is an enlarged sectional detail taken through the front fork and the front end of the tricycle backbone.

Fig. 3 is an elevation of a ball retainer.

Fig. 4 is a section taken along line 4—4 of Fig. 3.

Fig. 5 is a side elevation of the thrust member and fender support of Fig. 2.

Fig. 6 is a sectional detail taken along line 6—6 of Fig. 2.

Fig. 7 is a sectional detail taken along line 7—7 of Fig. 2.

A form of velocipede or tricycle in which the present invention is incorporated is illustrated in Fig. 1, and comprises a tubular frame or backbone 10 joined at its rear end to a U-shaped tube 12 carrying the rear axle on which the rear wheels 14 are rotatable. The front part of the backbone tube 10 is inserted through the side wall of a tubular vertical steering fork housing 16, the housing being formed of an originally flat sheet of metal shaped into cylindrical form and having confronting ends as at 18, Fig. 7. The tube 10 is extended into the housing 16 and is welded to the housing by welding metal 20 deposited on the two tubes inside the tube 16 through the open ends of the latter tube. This construction is described and claimed in my co-pending application Serial No. 370,489, filed December 17, 1940.

The velocipede has a steering fork 22 formed generally of U-shape and of semi-cylindrical form in cross section, as illustrated in Fig. 2, and supports at its lower end the front wheel 24. The fork 22 has welded to its upper part a bearing or steering post or tube 26 which extends through the housing 16. The velocipede has handle bars 28, the post 30 of which extends into the tube 26 and is secured in position by a clamping ring 32 which encircles the upper end part of the tube 26 and has a clamping screw 34 which bears against the post 30 through a slot 36 in the side of the tube 26. The front fork is also provided with a fender 38.

The open upper and lower ends of the housing 16 are closed by metal end caps which are pressed on the housing, the end caps also forming retainer members for the anti-friction bearings. The upper end cap 40 has an outer cylindrical flange 42 which closely surrounds and is in tight fitting engagement with the upper end part of the cylindrical housing. The top face of the end cap is provided with a bearing recess 44 formed by the axial wall 46 which ends in a radial wall 48, the inner end of the radial wall being provided with an axially-extended annular wall or neck 50 which closely surrounds the steering tube 26 and is adapted to be used as a bearing for the post in the event that the anti-friction bearing becomes removed or lost.

The lower end cap 52 is identical with the upper end cap and has the outer cylindrical flange 54 that is in tight engagement with the lower part of the housing 16 and the bearing recess 56 formed by the inner axial wall 58 and the radial end wall 60. The inner end of the inner end wall also terminates in an axially-extended annular wall 62 that closely surrounds the steering tube 26 to function as a bearing in the event of loss of the anti-friction bearing.

The anti-friction bearings for the end caps are identical. Each comprises an annular series of bearing balls 64 rotatably retained in a ball retainer comprising a ring 66 located at one side of the annular series of balls and of arcuate cross section in a radial plane as illustrated particularly in Fig. 4, the arc being struck from a radius somewhat smaller than the radius of the balls so that the balls engage the ring at the inner and outer edges only thereof. The ring between the balls has axially extended ball spacing projections 68 with curled over end parts 70 that serve to retain the balls in the retainer. The upper retainer with its balls is located in the recess 44 so that the balls rest upon the bottom wall 48 of the end cap and directly engage the inner axial wall 46 of the end cap and the outer face of the steering tube 26 and thereby support the tube against radial displacement. The ring 66 is uppermost and bears loosely against the under face of the steering post clamping ring 32 so that the ring and the radial wall 48 of the end cap receive the axial thrust.

The lower ball bearing is disposed in the recess 56 of the lower end cap 52 with the balls located between and bearing against the outer face of the steering tube 26 and axial wall 58 of the end cap. The balls are seated upon the radial wall 60 of the end cap. The retainer ring is seated upon the horizontal wall 72 of a collar or foot member 74 that surrounds the junction of the post 26 and the steering fork 22. The collar has a conical side wall 76 which extends downwardly to the steering fork and opposite sections of the side wall are of semi-cylindrical configuration, as illustrated at 78, Fig. 5, to conform to the cross section of the steering fork, so that the collar is seated non-rotatably upon the steering fork and receives the weight of the tricycle backbone and the rider. The collar is provided with a rearwardly extended extension 80 that overlies the upper part of the fender 38 and a screw 82 passes through the extension or ear 80 and into the fender to support the fender by the steering fork.

With the above described construction, the steering post 26 is supported in the housing 16 in substantially anti-frictional manner against both radial and axial thrust. The post 26 is supported against radial displacement by direct engagement of the balls with the post and with the axial inner walls 58 and 46 of the end caps. Axial displacement of the post is prevented by engagement of the balls with the radial inner walls 60 and 48 of the end caps and with the collar 76 and the clamping ring 32. While axial thrust on the balls is transmitted through the retainer ring 66, the adjustment of the bearings is such that this ring is free to rotate in engagement with the horizontal wall 72 of the collar or foot member and with the end wall of the clamping ring 32, the action being a combined sliding action of the ring and rolling action of the balls.

The assembly of the parts is simple since the parts are merely dropped into place and are retained in position by tightening the nut 34 upon the handle bar post 30.

The construction is inexpensive since there are no machined and screw-threaded parts, all of the parts being stampings, or the equivalent, pressed together. Loss of a bearing, as may be occasioned by a child taking the velocipede apart out of curiosity, does not render the velocipede unuseable since the annular walls or necks 50 and 62 can then provide a bearing for the steering fork tube 26.

I claim:

1. In a velocipede, a backbone tube, a steering fork tube fixed to the front end part of the backbone tube, caps on the open ends of the steering fork tube having cylindrical side walls overlying and in closely fitting engagement with the outer side wall of the steering fork tube and end walls which bear against and overlie the ends of the steering fork tube having cup-shaped depressions therein which enter the ends of the steering fork tube, ball bearings located in said cup-shaped depressions in bearing engagement both with the bottom and with the side walls of said depressions, the bottom walls of said depressions having aligned openings therein, a steering fork having a post located loosely in said openings and in direct bearing engagement with said ball bearings and being supported rotatably thereby against displacement radially of the fork, a member carried by said fork beneath and in operative bearing relation with the lower ball bearing, and a collar on the upper end part of said post above and in retaining and operative bearing relation with said upper ball bearing, said member and collar exerting thrust on said bearings axially of said fork.

2. In a velocipede, a backbone tube, a steering fork tube fixed to the front end part of the backbone tube, caps on the open ends of the steering fork tube having cylindrical side walls overlying and in closely fitting engagement with the outer side wall of the steering fork tube and end walls which bear against and overlie the ends of the steering fork tube having cup-shaped depressions therein, which enter the ends of the steering fork tube, ball bearings located in said cup-shaped depressions in bearing engagement both with the bottom and with the side walls of said depressions, the bottom walls of said depressions having aligned openings therein, a steering fork having a post located loosely in said openings and in direct bearing engagement with said ball bearings and being supported rotatably thereby against displacement radially of the fork, a member carried by said fork beneath and in operative bearing relation with the lower ball bearing, and a collar on said post above and in retaining and operative bearing relation with said upper ball bearing, said member and collar exerting thrust on said bearings axially of said fork, said steering fork tube being formed of a flat metal sheet which has been given a cylindrical form with the opposite ends of the sheet disposed in confronting relation and the side walls of said end caps constituting means maintaining the cylindrical configuration of said tube.

3. In a velocipede, the combination of a backbone having a steering fork tube at the front end thereof, end caps on the ends of said tube each having a cylindrical side wall which closely fits over and surrounds the outer face of said tube and an end wall which overlies the end of said tube and has a cup-shaped depression located within the end of said tube, the cup-shaped depression having an annular outer wall and a bottom wall provided with an opening therethrough and a bearing neck that surrounds the aperture, ball bearings in said cup-shaped depressions, a steering fork having a post extended through said apertures and steering fork tube and through said necks and engaged with said bearings, and retainer means carried by said tube overlying said bearings exerting thrust on said ball bearings axially of said fork and on the bottom walls of said depressions.

4. In a velocipede, a frame having a steering fork tube at the front end thereof, end caps fitted onto the ends of said tube having cylindrical side walls engaged with the outer surface of said tube and end walls which overlie the ends of said tube and having cup-shaped depressions therein located within said tube and provided with annular side walls and radial bottom walls, the radial bottom walls having aligned openings therethrough, a steering fork having a post extended through said openings, ball bearings in said cup-shaped depressions each comprising an annular series of balls engaged with the annular and radial walls of the depressions and with said post radially thereof and a retainer ring carrying said balls disposed at one side of the collection of balls and having means interposed between said balls for separating them, a retainer member carried by said post and fork underlying and supporting the lower set of balls and exerting thrust axially of said post on said balls and the cooperating bottom wall of the depression, and a collar carried by said post overlying and retaining in position the upper set of balls and exerting thrust axially of said post on said balls and the cooperating bottom wall of the depression.

5. A velocipede as in claim 4, there being a wheel fender having a supporting connection with said retainer member.

6. In a velocipede, a frame having a steering fork tube at the front part thereof, end caps on the ends of said tube having cylindrical side walls surrounding and tightly engaged with the outer face of said tube and having apertured end walls located within said steering fork tube and provided with cup-shaped depressions surrounding said apertures, ball bearings in said depressions, a steering fork having a post extended through said apertures and engaged with said bearings, a bearing retaining collar seated on said fork and surrounding said post and having its lower face conformed and outlined to the configuration of said fork whereby it is keyed to said fork for turning movement conjointly with said fork and post.

7. A velocipede as in claim 6, there being a wheel fender extended through the fork and having a supporting connection with said retaining member.

8. In a velocipede, a frame having a steering fork tube at the front end thereof, end caps on the ends of said tube having cylindrical side walls engaging and overlying the outer face of said tube and having apertured end walls and cup-shaped bearing depressions surrounding said apertures, ball bearings in said depressions, a steering fork arcuate in cross-section having a post extended upwardly above said arcuate section and through said apertures and in engagement with said bearings, a lower bearing retaining member having an end wall underlying and in retaining relation with the lower ball bearing and having a depending side wall the edge part of which is seated upon and is conformed in configuration with the configuration of the part of the fork engaged therewith and hence having a side wall which is lower at the front and rear parts than elsewhere, whereby it is interlocked with the fork to turn therewith, and bearing retainer means carried by said post overlying the upper ball bearing.

9. A velocipede as in claim 8, said lower bearing retainer having a side wall extension, and a wheel fender fixed to and carried by said extension.

10. In a velocipede, a frame having a steering fork tube at the front end thereof, end caps on the ends of said tube having cylindrical side walls that are closely engaged with and surround the outer face of said tube and have end walls that overlie the ends of said tube and are provided with cup-shaped depressions entering said tube, said cup-shaped depressions having annular side walls and radial bottom walls and apertures in the bottom walls surrounded by necks projecting inwardly of said tube, ball bearings in said cup-shaped depressions, and a steering fork having a post extended through said necked apertures and engaging said bearings, said necks being normally out of engagement with said post but sufficiently closely surrounding said post to provide a rotatable bearing therefor in the event of loss or failure of a ball bearing.

11. In a velocipede, a frame having a steering fork tube at the front end thereof, end caps on the ends of said tube having cylindrical side walls that engage and overlie the outer face of said tube, and having end walls that overlie the ends of said tube and have cup-shaped depressions therein provided with annular side walls and radial end walls, the radial end walls having aligned apertures, a steering fork having a post extended through said apertures and said cup-shaped depressions and ball bearings in said cup-shaped depressions comprising an annular row of ball bearings in each depression having a retainer ring provided with means for rotatably holding said balls in spaced relation, said balls being in direct rolling engagement with the annular side and radial bottom wall of its associated depression and with the outer face of said post, said steering fork and post having means applying pressure in a direction axially of said post on said rows of balls, the construction being such that said balls provide combined radial and axial support for said post.

12. In a velocipede, a frame having a steering fork tube on the front end thereof, pressed metal end caps on the ends of said tube having cylindrical side walls pressed onto the ends of the tube, said end caps also having pressed in their end walls cup-shaped depressions which enter the tube and open outwardly of the end caps and have annular side walls and radial end walls provided with aligned openings therethrough, a steering fork having a post extended through said openings and through said depressions, an annular row of ball bearings in each depression having a retainer ring which spaces the balls apart, the balls having direct engagement with said end caps and posts, a foot member on said post underlying and exerting thrust axially of said post on said lower row of balls, a retainer collar on the upper end of said post overlying the upper row of balls, and means including a clamping screw threaded in said collar for securing said collar to said post.

JOHN A. CONTI.